United States Patent [19]
Flecha et al.

[11] Patent Number: 5,773,824
[45] Date of Patent: Jun. 30, 1998

[54] METHOD FOR IMPROVING MEASUREMENT ACCURACY USING ACTIVE LATERAL SCANNING CONTROL OF A PROBE

[75] Inventors: Edwin Flecha; Martin Allen Klos; Kenneth G. Roessler, all of Boca Raton, Fla.; Robert Marshall Stowell, West Linn, Oreg.

[73] Assignee: International Business Machines Corporation, Armonk, N.Y.

[21] Appl. No.: 841,538

[22] Filed: Apr. 23, 1997

[51] Int. Cl.[6] .................................................. H01J 37/28
[52] U.S. Cl. .......................... 250/306; 250/307; 73/105
[58] Field of Search .................................. 250/306, 307; 73/105

[56] References Cited

U.S. PATENT DOCUMENTS

| | | | |
|---|---|---|---|
| 4,343,993 | 8/1982 | Binning et al. | 250/306 |
| 4,724,318 | 2/1988 | Binning | 250/498 |
| 4,987,303 | 1/1991 | Takase et al. | 250/306 |
| 5,107,114 | 4/1992 | Nishioka et al. | 250/306 |
| 5,186,041 | 2/1993 | Nyyssonen | 73/105 |
| 5,260,572 | 11/1993 | Marshall | 250/306 |
| 5,262,643 | 11/1993 | Hammond et al. | 250/306 |
| 5,321,977 | 6/1994 | Clabes et al. | 73/105 |
| 5,345,816 | 9/1994 | Clabes et al. | 73/105 |
| 5,347,854 | 9/1994 | Martin et al. | 73/105 |
| 5,414,690 | 5/1995 | Shido et al. | 369/126 |
| 5,415,027 | 5/1995 | Elings et al. | 73/105 |
| 5,418,363 | 5/1995 | Elings et al. | 250/306 |
| 5,466,935 | 11/1995 | Ray et al. | 250/306 |

FOREIGN PATENT DOCUMENTS

| | | |
|---|---|---|
| 3-180702 | 8/1991 | Japan . |
| 4-318404 | 11/1992 | Japan . |

OTHER PUBLICATIONS

*IBM Technical Disclosure Bulletin,* Microprobe–Based Measurement Tool, vol. 32, No. 7, Dec. 1989, p. 168.
*IBM Technical Disclosure Bulletin,* Fast Image Acquisition with Scanning Tunneling Microscope or Atomic Force Microscope, vol. 36, No. 03, Mar., 1993, p. 93.

*Primary Examiner*—Kiet T. Nuyen
*Attorney, Agent, or Firm*—Richard A. Tomlin; Ronald V. Davidge

[57] ABSTRACT

A scanning probe microscope includes probe moved into and out of engagement with a sample surface by a combination of deflections occurring within a fast actuator, having a relatively small range of motion, and a slow actuator, having a relatively large range of motion. When the deflection of the fast actuator is moved outside a predetermined range, in which such deflection is a linear function of applied voltage, the slow actuator is operated so that subsequent operation of the fast actuator can return the fast actuator to its predetermined range, Furthermore, when it is necessary to operate the slow actuator in this way, a scanning motion moving the sample surface past the probe is stopped until the probe is brought into a correct level of engagement with the sample surface, with the fast actuator deflected within the predetermined range.

19 Claims, 2 Drawing Sheets

METHOD FOR IMPROVING MEASUREMENT ACCURACY USING ACTIVE LATERAL SCANNING CONTROL OF A PROBE

BACKGROUND OF THE INVENTION

1. Field of the Invention

This invention relates to a method for improving the accuracy of measurements made with a scanning probe microscope, and, more particularly, to improving such accuracy by maintaining operation of a fast, non-linear vertical actuator within a linear range, in a system having dual vertical actuators to control the engagement of the probe with the surface of a sample.

2. Background Information

In the conventional operation of a scanning probe microscope, lateral movement of the probe, or of the sample relative to the probe, is performed according to a predetermined motion profile, which is usually in the form of a sinusoidal or sawtooth curve. This lateral motion is often provided as an input to the device in the form of a frequency, expressed in Hertz, with data points being taken at a constant rate, even when the drive moving the probe in a vertical direction cannot keep up with changes in the elevation of the surface of the sample being measured. This type of operation can lead to damage to the probe and to the sample due to a "crash" condition occurring therebetween and to a degradation of measurement accuracy whenever vertical movement cannot keep up with such changes.

Conventional scanning probe microscopes employ a single piezoelectric actuator to move the probe in the vertical z-direction. Such devices often encounter a problem associated with an inability to obtain a very high digital bit resolution of the actuator movement together with a suitably large dynamic range of movement. For a particular piezoelectric material, the maximum dynamic range which can be achieved is determined by the piezo constant, C, expressed in Angstroms/Volt, and the maximum operational voltage, $V_{max}$. The bit resolution is given by the following expression:

$$R = \frac{V_{max}C}{N}$$

In this expression, R is the bit resolution, and N is the bit count. For example, if the digital signal generated within a computing device is fed through a 16-bit digital to analog converter in order to generate the analog signal needed to drive the actuator, the bit count is 65,535.

What is needed is a way to obtain high resolution without sacrificing the vertical (engagement) probe travel needed in many applications.

DESCRIPTION OF THE PRIOR ART

The patent art includes a number of patents, such as U.S. Pat. Nos. 4,343,993 and 4,724,318, describing scanning probe microscope technologies in which the present invention can be applied.

U.S. Pat. No. 4,343,993 describes a scanning tunneling microscope, in which a very sharp metal tip is raster-scanned across a surface to be inspected at a distance so small that the electron clouds of the atoms at the apex of the tip and on the surface area closest to the tip gently touch. A so-called tunnel current then flows across the gap, provided a potential difference exists between the tip and the surface. Since this tunnel current is exponentially dependent on the distance between the tip and the surface, a correction signal is generated, based on deviations from a predetermined value occurring as the tip is scanned across the surface of the sample. The correction signal is used to control the tunnel distance so as to minimize the correction signal, and to be plotted versus a position signal derived from the physical position of the tip over the surface being inspected. This technique permits a resolution down to an atomic scale, so that individual atoms on the surface can be made visible.

U.S. Pat. No. 4,724,318 describes an atomic force microscope, in which a sharp point is brought so close to the surface of a sample to be investigated that the forces occurring between the atoms as the apex of the point and those at the surface cause a spring-like cantilever to deflect. The cantilever forms one electrode of a tunneling microscope, the other electrode being a sharp tip. The deflection of the cantilever provokes a variation of the tunnel current, and that variation is used to generate a correction signal which can be employed to control the distance between the point and the sample, in order, for example, to maintain the force between them constant as the point is scanned across the surface of the sample by means of an xyz-drive, with the sample being driven in a raster scan in the xy-plane. In certain modes of operation, either the sample or the cantilever may be excited to oscillate in the z-direction. If the oscillation is at the resonance frequency of the cantilever, the resolution is enhanced. Using this method, a topographical image of a sample surface having a resolution better than 100 nanometers may be obtained by employing the following steps: A sharp point which is fixed to one end of a spring-like cantilever is brought so close to the surface of the sample that the forces occurring between the point and the sample surface are larger than $10^{-20}$ Newton, so that the resulting force deflects the cantilever. The deflection of the cantilever is detected by means of a tunnel tip disposed adjacent the cantilever. The tunnel current then flowing across the gap between the cantilever and tunnel tip is maintained at a constant value by using any detected variations of the tunnel current to generate a correction signal. The correction signal is used, among other things, to maintain the point-to-sample distance constant.

While the abovementioned U.S. Patents provide descriptions of methods for using a scanning probe to develop data describing the surface of a test sample, the use of dual actuators to derive the benefits of relatively large movements with a slow actuator and of speed and accuracy with a fast actuator is not described. Thus, what is needed is a dual actuator system, including means for maintaining the fast actuator therein within a linear range of motion.

Other examples from the patent art, such as U.S. Pat. No. 5,345,816 and Japanese Patent Kokai No. 3-180702, provide methods for stopping or varying the scanning motion of the probe of a scanning probe microscope in response to detected variations in the topography of the sample surface.

U.S. Pat. No. 5,345,816 describes the use of an integrated tip strain sensor in combination with a single axis atomic force microscope for determining the profile of a surface in three directions. A cantilever beam carries an integrated tip stem on which is deposited a piezoelectric film strain sensor with four superimposed elements, which function in a plane perpendicular to that of the probe. Three-dimensional metrology is performed while catastrophic tip "crashes" with high extended features of the sample surface, such as sidewalls, are avoided. The potential for a tip "crash" is detected by the electrical signal output from the strain sensor exceeding a predetermined threshold. When the threshold is exceeded, the feedback control system stops the movement of the tip and then backs the tip away from a surface feature with which it has come into contact.

Japanese Patent Kokai No. 3-180702 describes a scan speed control method for a scanning tunnel microscope. This method controls the scanning mechanism in relation to a value obtained by differentiating vertical probe displacement. In this way, the scanning speed is reduced as the probe is moved over a bump.

While the above examples of prior art are concerned with preventing "crash" conditions and providing time for vertical probe movement when an inclination in the surface of the sample is encountered, these methods do not increase the available tip engagement motion through the use of a short-stroke fast actuator together with a slow actuator providing a relative long range of tip engagement motion. What is needed is such a dual-actuator system, together with a method for maintaining the displacement of the fast actuator in a linear range.

Other examples from the Patent Art, such as U.S. Pat. No. 5,414,690 and Japanese patent Kokai No. 4-318404, describe methods to move a scanning probe attached to a fine movement actuator which is, in turn, fastened to a coarse movement actuator.

U.S. Pat. No. 5,414,690 describes a method for moving a probe in a direction perpendicular to the surface of a sample by means of a fine movement section attached to the probe and a coarse movement section attached to the fine movement section. The fine movement section uses, for example, a piezo-electric actuator, while the coarse movement section is movable over a wide range by the use, for example, of a stepping motor.

Japanese patent Kokai No. 4-318404 describes a method enabling a probe to trace the surface of a sample, even if the surface is greatly "rough," by interlocking the movement of a fine adjustment mechanism and a coarse adjustment mechanism, based on the minute displacement state of the probe in an approaching/separating direction to the sample. A tunnel current detector detects a tunnel current, which starts to flow when a probe approaches the surface of the sample, within an atomic-level distance. This current is fed as an input signal to a fine adjustment mechanism control device, which in turn supplies an instruction signal to the fine adjustment mechanism. A device for detecting and evaluating the state of the fine adjustment mechanism receives positional data in the z-axis direction of the probe input from the fine adjustment mechanism control device, compares this data with reference data, and activates a coarse adjustment mechanism control device when it judges that the position of the probe cannot be changed as required by only a shift through the fine adjustment. When a coarse adjustment mechanism is to be driven, the coarse adjustment mechanism control device supplies an instruction signal, when necessary, to the fine adjustment mechanism control device, so that a required adjustment to the probe position is executed.

Thus, when a determination is made that the fine adjustment mechanism has moved through its entire intended range in a direction moving the probe away from the sample, the coarse adjustment mechanism is moved away from the sample through a distance equal to half of this intended range, so that the fine adjustment mechanism can be returned to the center of this intended range. When a determination is made that the fine adjustment mechanism has moved through its entire intended range in a direction moving the probe toward the sample, the coarse adjustment mechanism is moved toward the sample through a distance equal to half of this intended range, so that the fine adjustment mechanism can again be returned to the center of this intended range. Under certain circumstances, moving the coarse adjustment mechanism in this way does not result in the desired movement of the fine adjustment mechanism to the center, because the movements are not stabilized. These circumstances, which occur when a surface having deep recesses is scanned at a speed with which the control device moving the probe into and out of contact with the sample cannot keep up, cause the probe to vibrate. The system responds by moving the probe drastically away from the sample with the rough movement mechanism.

Furthermore, what is needed is a mechanism tying motion of the sample or probe in a scanning direction to the vertical (engagement) motion needed. Such a mechanism would be particularly effective in maintaining accurate operation and in preventing "crashes" when the tip encounters a sharp incline in the sample surface. When compared particularly to the method of Kokai No. 4-318404, a mechanism for stopping the scanning motion to allow for corrections by the probe engagement mechanisms would allow the accurate measurement of extreme surface features, such as deep grooves and sharply rising sidewalls.

SUMMARY OF THE INVENTION

In accordance with one aspect of the invention, there is provided apparatus for determining topographical characteristics of a sample surface. The apparatus includes a probe having a sharp tip movable into engagement with the sample surface in an engagement direction perpendicular to the sample surface, a probe detector, first and second drive mechanisms, each moving the probe in and opposite the engagement direction, and a lateral movement mechanism. The probe detector measures a physical parameter at the probe, with the physical parameter indicating contact conditions between the probe and the contact surfaces. The first drive mechanism moves the probe in response to the output of the probe detector to maintain contact conditions between the probe and the sample surface. The second drive mechanism moves the probe in response to movement of the first drive mechanism beyond a second predetermined range of movement. The first and second drive mechanisms are coupled to each other and the probe so that motion of the probe occurs in accordance with a sum of motion of the first and second drive mechanisms. The lateral movement mechanism generates relative movement between the sample surface and the sharp tip in a scanning direction parallel to the sample surface, with such motion being generated only when the first drive mechanism is within its second predetermined range of movement.

In accordance with another aspect of the present invention, there is provided a method for maintaining engagement conditions between a probe and a sample surface, with relative movement between the sample surface and the probe occurring in a scanning direction essentially parallel to said sample surface, exposing the sample surface adjacent to the probe, with movement of the probe in an engagement direction perpendicular to the scanning direction establishing engagement between the probe and the sample surface, and with the method including the steps of:

a) causing the relative motion between the sample surface and the probe in the scanning direction to occur through a single step;

b) measuring a physical parameter indicating a level of engagement between the probe and the sample surface;

c) moving the probe by a first engagement drive, having an output connected to the probe, to vary engagement of the probe with the sample surface, in response to the physical parameter measured in the step b);

d) determining if the first engagement drive is within a first predetermined range thereof;

e) returning to repeat the step a) if the first engagement drive is determined to be within the first predetermined range thereof in the step d):

f) moving the probe by a second engagement drive, having an output connected to the first engagement drive, if the first engagement drive is determined to be outside the first predetermined range thereof in the step d), and returning to repeat the step b).

DESCRIPTION OF THE INVENTION

Figure 1:
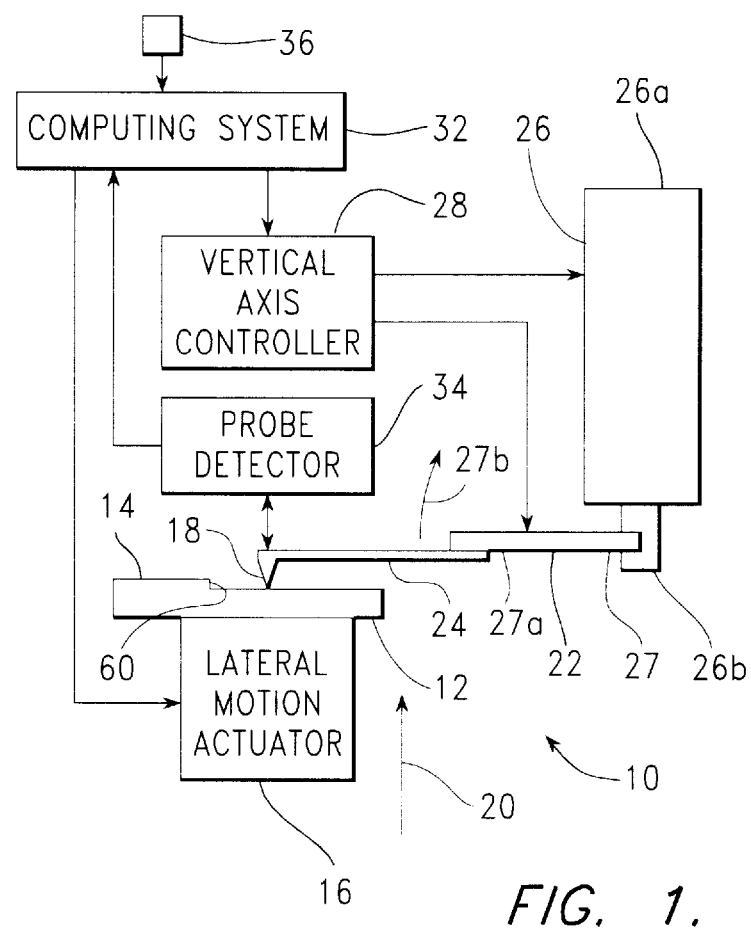
FIG. 1 is a schematic view of a scanning probe microscope in which the present invention is applied.

FIG. 1 is a general schematic view of a scanning probe microscope 10 in which the present invention is employed. In this microscope 10 a sample 12 is driven laterally, in one or more directions essentially parallel to its surface 14, by a lateral motion actuator 16. For example, this actuator 16 may drive the sample 12 in x- and y-directions, which are perpendicular to one another, producing a sinusoidal or sawtooth pattern of motion in which the sample surface 14 is moved past a probe 18. The probe 18 is moved in a z-direction, as indicated by arrow 20, which is perpendicular to both the x- and y-directions, by means of a fast actuator 22, which is coupled to the probe 18 through a cantilever 24, and by means of a slow actuator 26, which is in turn mechanically coupled to the fast actuator 22.

In the example of FIG. 1, the slow actuator 26 is mounted to a framework (not shown) at an upper end 26a, so that a lower end coupling 26b is moved in the upward direction of arrow 20 by contraction of the slow actuator 26 and opposite the direction of arrow 20 by the expansion of the slow actuator 26, with the slow actuator 26 being a piezo-electric device which expands and contracts in these directions in accordance with an applied electrical signal. The lower end coupling 26b clamps a proximal end 27 of the fast actuator 22, which is a bimorph device having a distal end 27a which deflects upward in the direction of arrow 27b, and downward, opposite thereto, in response to the application of an electrical signal.

A vertical axis controller 28 provides input signals driving both the fast actuator 22 and the slow actuator 26. A lateral motion controller 30 operates the lateral motion actuator 16 to determine the lateral pattern of scanning movement. Both vertical axis controller 28 and lateral motion controller 30 operate in response to signals from a computing system 32.

Since the probe 18 is resiliently mounted to the fast actuator 22 by means of the cantilever 24, its motion results from both the motion caused by the actuators 22, 26 and by underlying structures within the sample surface 14. The resulting motion of the probe 18 is measured by a tip detector 34, which in turn provides a motion output signal as an input to computing system 32.

The scanning probe microscope 10 may operate in accordance with a number of technologies which are known to those skilled in the art. For example, the scanning probe microscope 10 may operate in accordance with the atomic force microscope technology generally described in U.S. Pat. No. 4,724,318, with fast actuator 22 being driven to oscillate the cantilever 24 in the vertical direction of arrow 20 at a frequency near the resonance frequency of the cantilever, so that the resolution of the measuring device is enhanced. Also in accordance with U.S. Pat. No. 4,724,318, tip detector 34 may include various elements of a tunneling microscope, with a tunneling current being established between a surface of the cantilever 24 and a sharp point (not shown). The output of tip detector 34 is used to generate a correction signal, which causes a variation in the signal applied to either or both of the actuators 22, 26 to maintain the force between sample surface 14 and probe tip 18 within a predetermined range.

Alternately, tip detector 34 may be a laser detector, providing an output indicating the amplitude of vibration occurring at the probe tip 18, together with the phase angle of this vibration relative to the vibration provided as an output of the fast actuator 22. The measured amplitude is then compared with a preset amplitude setpoint, and the difference is used to generate a correction signal.

In another version of the present invention, the scanning tunneling microscope technology generally described in U.S. Pat. No. 4,343,993 is used. With this technology, excitation to the fast actuator 22 to produce a vibration of the probe tip 18 does not occur, and the tip detector 34 detects, not motion of the probe tip 34, but rather a tunneling current flowing between the sample surface 14 and the probe tip 18.

The input motion applied to the cantilever 24 is determined directly from the input signals applied to the fast actuator 22 and the slow actuator 26. As a practical matter, the fast actuator 22 is, for example, a generally nonlinear, open loop device having a short stroke. The slow actuator 26 is, for example, an extremely linear, closed loop, long stroke device. For example, the slow actuator may be used to provide vertical movement of the probe 18 over a 14-micron range. Since accurate measurements with the microscope 10 depend on an accurate knowledge of the deflection occurring within the fast actuator 22, it is particularly important that this actuator must be operated within a linear portion of its motion range. In this linear portion of the motion range, the deflection occurring within the fast actuator 22 is linear function of the electrical signal applied to the actuator 22. This linear portion of its motion range is typically located near, but not precisely at, the center of this total motion range. Thus, while the fast actuator 22 may provide maximum motion at the probe tip 18 through a 1- or 2-micron range, only a fraction of this motion can be used if a requirement for linear operation is to be met. Departure from the linear range makes calculation of the deflection occurring within the fast actuator 22, as a function of the voltage or current applied to it, increasingly difficult and unreliable due to the nonlinearities.

Figure 2:
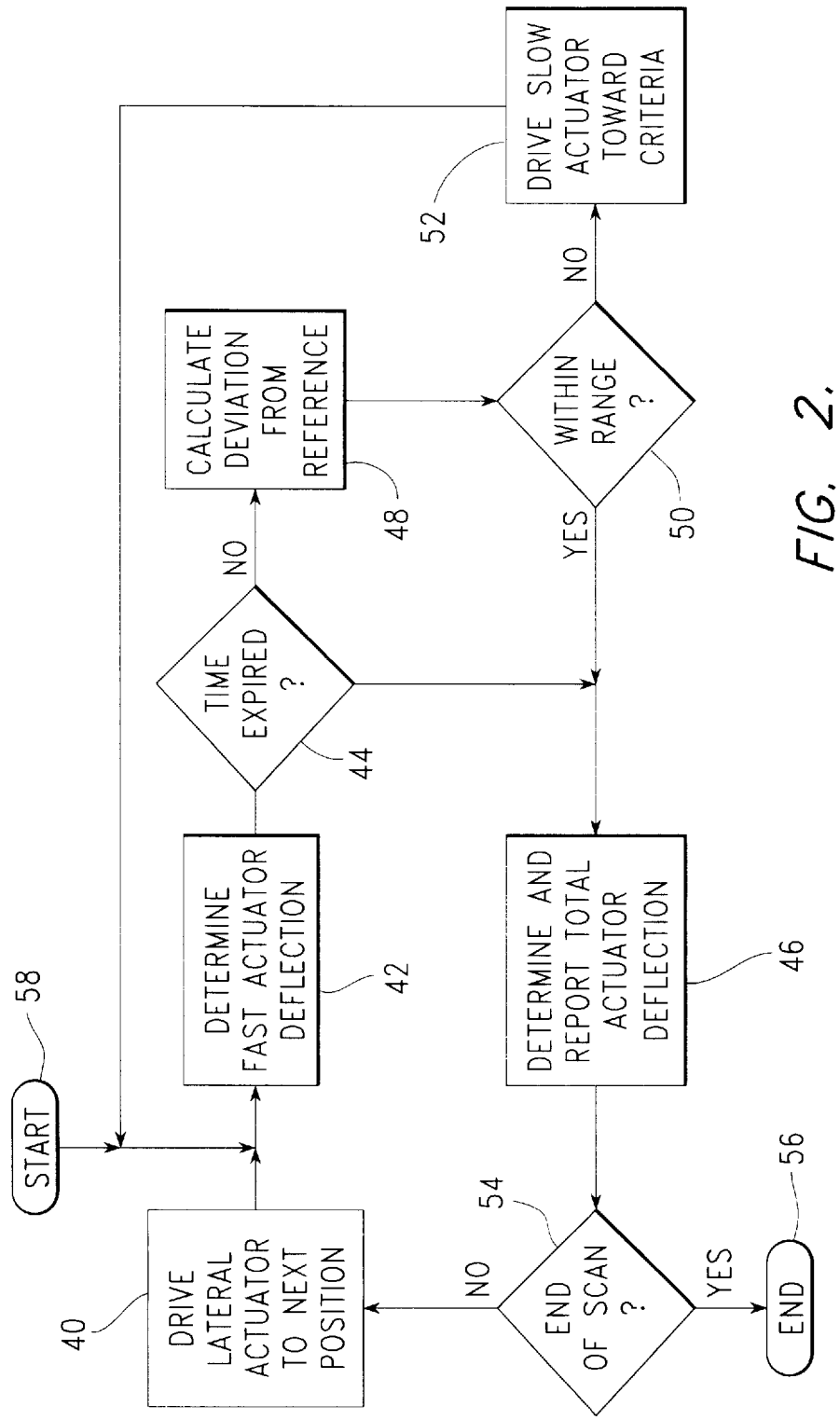
FIG. 2 is a flow diagram of a process occurring within the microscope of FIG. 1 in accordance with the present invention.

FIG. 2 is a flow chart showing a process used, according to the present invention, within the scanning probe microscope 10 to maintain operation of the fast actuator 22 within its linear range. Referring to FIGS. 1 and 2, this process is implemented by means of a routine within a computer program executing within the computing system 32. This program is provided to the computing system 32 through a computer readable medium 36, such as a CD-ROM or one or more magnetically written diskettes. For purposes of calculations occurring within the computing system 32, the lateral motion of sample 12, occurring as a result of the operation of lateral motion actuator 16, is broken up into a number of very small "micro" steps. These micro-steps, taken together, may, for example, move the sample 12 in a sawtooth or raster pattern in the x- and y-directions. While the lateral motion actuator 16 may operate in a slew mode, moving the sample 12 from one micro-step to another without stopping between such steps, when the program executing within computing system 32 determines that such motion should be stopped, the actuator 16 stops the sample 12 at an individual micro-step.

Thus, the lateral movement of sample 12 occurs in a number of microsteps, with each micro-step taking place in block 40 of the process of FIG. 2. Next, in block 42, the output of probe detector 34 is used to determine a new value for the deflection of the fast actuator 22. This value is used to apply a driving signal to the fast actuator 22 through the vertical axis controller 28. In some instances, the time available for this portion of the process may expire. If this occurs, as determined in block 44, the process is escaped to block 46, in which the total deflection caused by both the fast actuator 22 and the slow actuator 26 is calculated. This deflection is reported to the system, which will use it, together with the output of probe detector 34, to determine the local topographical characteristics of the sample surface 14.

Normally, sufficient time is available to permit processing, and the system proceeds from block 44 to block 48, in which the deviation of the fast actuator position from a reference position is calculated by subtracting the voltage signal applied to the fast actuator from a reference voltage. As next determined in block 50, if the applied voltage is within a predetermined voltage range around the reference voltage, the fast actuator 22 is determined to be within the desirable, predetermined range, in which operation of the actuator 22 is linear and predictable. Thus, when the deflection of fast actuator 22 is within this range, the routine proceeds to block 46.

On the other hand, if it is determined in block 50 that the deflection of fast actuator 22 is outside the predetermined range in either direction, the routine proceeds to block 52, in which the slow actuator 26 is driven in a direction tending to eliminate or reduce the difference. That is, if the distal end 27a of fast actuator 22 is moved too far upward, in the direction of arrow 20, to remain in the predetermined linear range of movement, the coupling 26b is moved downward, opposite the direction of arrow 20, by changing the voltage applied to slow actuator 26 in block 52. Next, in block 42, the output of probe detector 34 is examined to determine how the electrical signal driving fast actuator 22 should be changed to restore the appropriate level of engagement between the probe tip 18 and the sample surface 14. This new signal is then applied to the fast actuator 22, also in block 42. Next, the processes described above as following block 42 are repeated. If the fast actuator 22 has been moved far enough to return to its predetermined linear range of movement, as determined in block 50, the scanning motion is continued in block 40. Otherwise, one or more additional cycles of movement of the slow actuator 52 are used, until the fast actuator 22 is returned to its linear range.

Similarly, if the distal end 27a of fast actuator 22 is moved too far downward, opposite the direction of arrow 20, to remain in the predetermined linear range of movement, the coupling 26b is moved downward, opposite the direction of arrow 20, by changing the voltage applied to slow actuator 26 in block 52. Again, in block 42, the output of probe detector 34 is examined to determine how the electrical signal driving fast actuator 22 should be changed to restore the appropriate level of engagement between the probe tip 18 and the sample surface 14. This new signal is then applied to the fast actuator 22, also in block 42. Next, the processes described above as following block 42 are repeated.

After the end of a scan operation is completed, as determined in block 54, the routine of FIG. 2 is ended in block 56. Otherwise, the process continues from block 54, moving to a next scanning position in block 40. The start of each scanning operation occurs in block 58, with a new deflection of the fast actuator 22 subsequently being determined in block 42.

Thus, the process occurring in accordance with the present invention provides a combination of the long stroke available from the slow actuator 26 and the fast reactions available from the fast actuator 22, with scanning movements taking place only after a level of deflection of the fast actuator 22 within a predetermined range of linear operation has been confirmed. In this way, the accuracy of measurements is made maintained, in spite of a need to use the voltage applied to the fast actuator 22 to determine its deflection. Furthermore, the use of the present invention prevents a "crash" when the probe 18 encounters an upward step 60 in the sample surface 14, by stopping the scanning motion entirely until the level of engagement between the probe 18 and the sample surface.

What is claimed is:

1. Apparatus for determining topographical characteristics of a sample surface, wherein said apparatus comprises:

a probe having a sharp tip movable into engagement with said sample surface in an engagement direction perpendicular to said sample surface;

a probe detector measuring a physical parameter at said probe, wherein said physical parameter is indicative of contact conditions between said probe and said sample surface;

first drive means moving said probe in said engagement direction and opposite thereto, in response to an output from said probe detector, to maintain contact conditions between said probe and said sample surface within a first predetermined range;

second drive means moving said probe in said engagement direction and opposite thereto, in response to movement of said first drive means beyond a second predetermined range of movement thereof as determined by examining an input signal applied to said first drive means, wherein said first and second drive means are coupled to each other and to said probe so that motion of said probe occurs according to a sum of motion of said first and second drive means; and lateral movement means for generating relative movement between said sample surface and said sharp tip in a scanning direction parallel to said sample surface, wherein said lateral movement means generates said relative movement only when said first drive means is within said second predetermined range of movement thereof.

2. The apparatus of claim 1, wherein said first drive means includes a bimorph piezoelectric actuator bending between a proximal end and a distal end thereof in response to a first electrical signal applied thereto, with said probe extending from said distal end thereof, and said second drive means includes a second piezoelectric actuator extending and contracting to move a clamping member attached thereto in response to a second electrical signal applied thereto, wherein said proximal end of said bimorph piezoelectric actuator is held within said clamping member.

3. The apparatus of claim 2, wherein said bimorph piezoelectric actuator moves said probe through a first range of motion, in accordance with a linear relationship between said electrical signal applied thereto and movement of said first drive means within said second predetermined range of movement thereof, and in accordance with a non-linear relationship between said electrical signal applied thereto and movement of said first drive means outside said second predetermined range of movement thereof, and said second piezoelectric actuator moves said clamping member through a second range of motion in accordance with a linear relationship between said electrical signal applied thereto and movement of said second drive means, with said second range of motion being substantially greater than said first range of motion.

4. The apparatus of claim 1, wherein said probe is resiliently coupled to said first drive means, said first drive means is driven with a harmonic signal to excite a vibration of said probe in said engagement direction, and said probe detector measures an amplitude of vibration of said probe.

5. The apparatus of claim 1, wherein said probe is rigidly coupled to said first drive means, and said probe detector measures a tunneling current between said sharp tip and said sample surface.

6. A method for maintaining engagement conditions between a probe and a sample surface, wherein relative movement between said sample surface and said probe in a scanning direction essentially parallel to said sample surface exposes said sample surface adjacent said probe, wherein movement of said probe in an engagement direction perpendicular to said scanning direction establishes engagement between said probe and said sample surface, and wherein said method comprises steps of:

a) causing said relative movement between said sample surface and said probe in said scanning direction to occur through a single step;

b) measuring a physical parameter indicating a level of engagement between said probe and said sample surface;

c) moving said probe by a first engagement drive, having an output connected to said probe, to vary engagement of said probe with said sample surface, in response to said physical parameter measured in said step b);

d) determining if said first engagement drive is within a first predetermined range thereof by examining an input signal applied to said first engagement drive:

e) returning to repeat said step a) if said first engagement drive is determined to be within said first predetermined range thereof in said step d):

f) moving said probe by a second engagement drive, having an output connected to said first engagement drive, if said first engagement drive is determined to be outside said first predetermined range thereof in said step d), and returning to repeat said step b).

7. The method of claim 6, having additionally a step returning to repeat said step a) from said step c) if processing time exceeds a predetermined maximum.

8. The method of claim 6, wherein said first drive means includes a bimorph piezoelectric actuator bending between a proximal end and a distal end thereof in response to a first electrical signal applied thereto, with said probe extending from said distal end thereof, and said second drive means includes a second piezoelectric actuator extending and contracting to move a clamping member attached thereto in response to a second electrical signal applied thereto, wherein said proximal end of said bimorph piezoelectric actuator is held within said clamping member.

9. The method of claim 8, wherein said bimorph piezoelectric actuator moves said probe through a first range of motion, in accordance with a linear relationship between said electrical signal applied thereto and movement of said first drive means within a second predetermined range of movement thereof, and in accordance with a non-linear relationship between said electrical signal applied thereto and movement of said first drive means outside said second predetermined range of movement thereof, and said second piezoelectric actuator moves said clamping member through a second range of motion in accordance with a linear relationship between said electrical signal applied thereto and movement of said second drive means, with said second range of motion being substantially greater than said first range of motion.

10. The method of claim 6, wherein said probe is resiliently coupled to said first drive means, said first drive means is driven with a harmonic signal to excite a vibration of said probe in said engagement direction, and said probe detector measures an amplitude of vibration of said probe.

11. The method of claim 6, wherein said probe is rigidly coupled to said first drive means, and said probe detector measures a tunneling current between said probe and said sample surface.

12. The method of claim 6, being performed in accordance with a control routine executing within a computing system.

13. A computer readable medium causing a computing system controlling operation of a scanning probe microscope to perform the following steps:

a) moving a sample surface through a single step in a scanning direction parallel to said sample surface;

b) measuring a physical parameter indicating a level of engagement between a probe and said sample surface;

c) moving said probe by a first engagement drive, having an output connected to said probe, to vary engagement of said probe with said sample surface, in response to said physical parameter measured in said step b);

d) determining if said first engagement drive is within a first predetermined range thereof by examining an input signal applied to said first engagement drive;

e) returning to repeat said step a) if said first engagement drive is determined to be within said first predetermined range thereof in said step d):

f) moving said probe by a second engagement drive, having an output connected to said first engagement drive, if said first engagement drive is determined to be outside said first predetermined range thereof in said step d), and returning to repeat said step b).

14. The medium of claim 13, additionally causing said computing system to perform a step returning to repeat said step a) from said step c) if processing time exceeds a predetermined maximum.

15. Apparatus for moving a probe across a sample surface while maintaining engagement between said probe and said sample surface within a first predetermined range, wherein said apparatus comprises:

probe detection means producing a correction signal indicating the motion required to move said engagement into said first predetermined range;

actuation means for moving said probe into and out of engagement with said sample surface, with said actuation means including a first actuator operated in response to said correction signal to move said engagement into said first predetermined range, and a second actuator operated to maintain operation of said first actuator within a second predetermined range as determined by examining an input signal to said first actuator with said engagement held within said first predetermined range; and lateral movement means for creating relative motion between said sample surface and said probe in a scanning direction along a plane parallel to said sample surface, wherein, after deflection of said first actuator is determined, when said first actuator is outside said second predetermined range, said second actuator is moved in a direction allowing a return of said first actuator toward said second predetermined range, and, when said first actuator is within said second predetermined range, said lateral movement means is operated to create said relative motion.

16. The apparatus of claim 15, wherein said first drive means includes a bimorph piezoelectric actuator bending between a proximal end and a distal end thereof in response to a first electrical signal applied thereto, with said probe extending from said distal end thereof, and said second drive means includes a second piezoelectric actuator extending and contracting to move a clamping member attached thereto in response to a second electrical signal applied thereto, wherein said proximal end of said bimorph piezoelectric actuator is held within said clamping member.

17. The apparatus of claim 16, wherein said bimorph piezoelectric actuator moves said probe through a first range of motion, in accordance with a linear relationship between said electrical signal applied thereto and movement of said first drive means within said second predetermined range of movement thereof, and in accordance with a non-linear relationship between said electrical signal applied thereto and movement of said first drive means outside said second predetermined range of movement thereof, and said second piezoelectric actuator moves said clamping member through a second range of motion in accordance with a linear relationship between said electrical signal applied thereto, and movement of said second drive means, with said second range of motion being substantially greater than said first range of motion.

18. The apparatus of claim 15, wherein said probe is resiliently coupled to said first drive means, said first actuator is driven with a harmonic signal to excite a vibration of said probe in said engagement direction, and said probe detector measures an amplitude of vibration of said probe.

19. The apparatus of claim 15, wherein said probe is rigidly coupled to said first actuator, and said probe detector measures a tunneling current between said probe and said sample surface.

* * * * *